United States Patent
Sensenig

Patent Number: 5,888,626
Date of Patent: *Mar. 30, 1999

[54] PLAIN SURFACE ACOUSTICAL PRODUCT AND COATING THEREFOR

[75] Inventor: Darryl L. Sensenig, Mountville, Pa.

[73] Assignee: Armstrong World Industries, Inc., Lancaster, Pa.

[*] Notice: The term of this patent shall not extend beyond the expiration date of Pat. No. 5,674,594.

[21] Appl. No.: 791,447

[22] Filed: Jan. 27, 1997

Related U.S. Application Data

[63] Continuation of Ser. No. 522,970, Sep. 1, 1995, abandoned.

[51] Int. Cl.[6] .......................................... B32B 5/16
[52] U.S. Cl. .......................... 428/206; 428/219; 428/330; 428/341; 428/342

[56] References Cited

U.S. PATENT DOCUMENTS 3,583,522  6/1971  Rohweker et al.
4,010,134  3/1977  Braunisch et al. ................ 523/220

Primary Examiner—Marion McCamish
Assistant Examiner—Elizabeth M. Cole

[57] ABSTRACT

This invention describes two products both with a plain, fine textured, nonperforated surface visual consisting of a fiberboard substrate with or without a laminated porous nonwoven scrim and then a finished painted surface. The finish painted surface decorates or finishes the board, but most important, must remain acoustically transparent to retain the sound absorption properties of the fiberboard prior to painting. The fiberboard substrate is made to be porous or modified with hole perforations to cause it to be a good sound absorber. If the fiberboard substrate is sufficiently porous without hole perforations, then the sprayable, high solids, porous paint can be directly applied. If hole perforations are used to improve the sound absorption properties of the board substrate, then a porous, nonwoven scrim is attached and painted using the same high solids porous paint. This painted scrim must be sufficiently optically opaque to hide the hole punched board, yet sufficiently open to render it acoustically transparent. The inventions also include the paint coating alone or the paint/scrim coating alone.

7 Claims, 1 Drawing Sheet

PLAIN SURFACE ACOUSTICAL PRODUCT AND COATING THEREFOR

This is a continuation of application Ser. No. 522,970 filed on Sep. 1, 1995, now abandoned.

BACKGROUND OF THE INVENTION

FIELD OF THE INVENTION

The invention is directed to an improved acoustical fiberboard and the coating therefor. Methods for obtaining high noise reduction coefficients (NRC) are well known. NRC values are secured by using ASTM test C423-90a to measure the NRC of a product. Fiberglass is known to be a good sound absorber since it has high porosity. It can be decorated with a surface layer of laminated fabrics or painted scrims requiring only a minimal openness in the surface layer for sound to pass through and be absorbed in the substrate.

To make an acoustically high NRC (= or >65) product using a wood or mineral fiberboard substrate, the board porosity must be high. Finish paint applied directly to the board also must not form a continuous film closing off the board surface. Normally this occurs thus lowering the NRC. A method generally used to increase the NRC is hole punching and surface perforations.

The desired product herein is to have a high NRC with a plain, fine textured, nonperforated surface visual. If a sanded and painted fiberboard without surface perforations and scrim is the construction, then the porosity of the paint layer must be equal or greater than the porosity of the board in order to retain the sound absorption properties of the board. The special paint that enables high application rates providing adequate coverage while remaining porous is the subject of this invention. Attaining a high porosity and NRC = or >65 is not easily accomplished with fiberboard without sacrificing other material properties such as strength and hardness.

If hole punching the fiberboard is needed to achieve the NRC = or >65, then a facing layer is necessary in order to make a plain, nonperforated surface visual. Porous nonwoven scrims are attached for this purpose. Again a special paint is necessary to cover the scrim to make it optically opaque. Opacity is needed to hide the holes yet it must be acoustically transparent. The combination of the scrim and special paint herein is also the subject of this invention.

SUMMARY OF THE INVENTION

This invention describes a plain, fine textured product consisting of a wood or mineral fiber substrate having a high NRC (= or >65) and a surfacing that does not alter the substrate sound absorption characteristics. The surfacing described herein is intended to render a product having a plain, fine textured surface without holes or surface perforations. This surface layer can be a directly applied paint or an attached painted nonwoven scrim. The critical characteristic of this surfacing is that it is acoustically transparent so that the sound can penetrate through the surface and be absorbed in the substrate.

Paints are generally designed and applied at sufficient rates to form a continuous film. Atomized paint droplets coalesce and normally flow, and wick on the substrate to spread over the surface forming a film. This same type of wicking and spreading occurs when painting porous scrims. Retaining acoustical transparency of the surface can be attained by applying small amounts of paint insufficient to form a film, but these small amounts are not optically opaque. Another method is to use a paint having minimal wicking and spreading characteristics. More paint can then be applied without closing off the surface. If hole perforations are needed to develop the desired NRC, these holes can be hidden by applying a porous nonwoven scrim to the board surface bridging the holes and then painted with an acoustically porous paint.

An invention herein describes a paint which has restricted flow properties and minimized coalescence when applied, thus retaining discrete paint droplets. This is accomplished with a critically high solids/low liquid suspension ranging from about 70–85% solids by weight which increases viscosity quickly with minimal water loss. The paint also has to have a greater affinity for itself than for the surface to which it is applied. By adding coarse limestone (ranging from 40 mesh to 150 mesh) to a more conventional fine particle paint, the total filler level can be increased to 82% solids while retaining a relatively low viscosity of about 1000–8000 cps. Other particles that can be used are glass beads, silica, perlite, etc. Using these coarse fillers in blends with very fine fillers and binders, causes the liquids and fine fillers to hold to the coarse limestone by surface tension. This prevents wicking of the droplets into the surface of the fiberboard or the scrim. The combination of the paint and scrim is another invention herein. The combination of the paint or paint and scrim on a fiberboard is another invention herein.

In all three inventions, since flow and coalescence of the paint droplets is minimal, this high solids coating remains discontinuous allowing heavier application rates while retaining an openness essential for air and sound passage.

If desired, the porosity of the paint coating could be used to reduce the sound absorption of the fiberboard.

DESCRIPTION OF THE INVENTION

Figure 1:
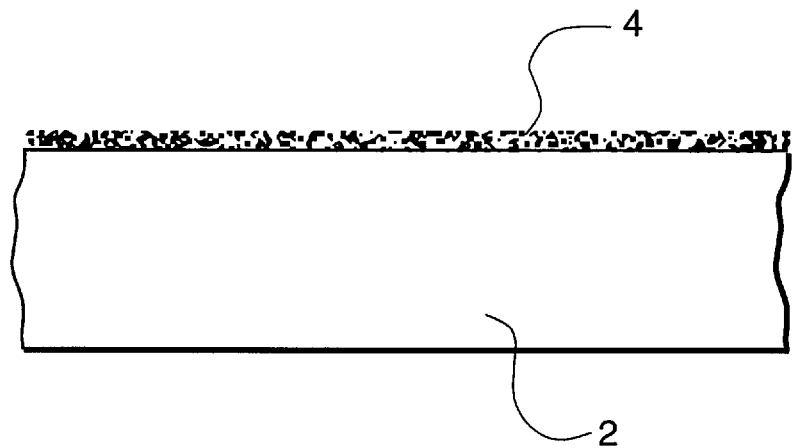
FIG. 1 is a side view of a discontinuous paint coating on a porous fiberboard.

It was determined that paints with a high percent of solids, particularly coarse fillers, permits significantly higher application rates while retaining openness essential for good air and sound passage into a sound absorbing substrate. By blending coarse limestone (ranging from 40 mesh to 150 mesh) with extremely fine (325 mesh and finer) limestone, titanium dioxide, binder and water, unusual properties are secured when this suspension is spray applied. This paint has minimal wicking and spreading characteristics. Minimal coalescence occurs retaining more discrete individual paint droplets. The liquid and fine fillers have a greater affinity for the large particle limestone than for the surface to which they are applied. The factor minimizing coalescence of the paint droplets is the critically high solids, so that with minimal water loss the viscosity quickly increases thus setting the droplet and retaining discrete paint droplets. The use of coarse fillers enables up to 82% filled suspensions with viscosity ranging from about 1000–4000 cps, permitting spray application via air atomized guns. The amount of fillers and known viscosity altering agents will permit other viscosity ranges higher or lower than above.

The preferred formulation at present for the paint is as follows:

| Ingredients | % By Weight | Range % |
| --- | --- | --- |
| Binder-Hycar Acrylic latex emulsion 50% solids by weight - B. F. Goodrich | 6.80 | 4–20 |
| Filler-Omyacarb slurry limestone 70% solids by weight - Omya Corp. | 33.78 | 30–55 |
| Filler-40 mesh limestone 100% solids - Pfizer | 50.95 | 30–55 |
| Filler-Titanium dioxide 100% solids | 1.41 | 1–8 |
| Liquid-Water | 7.06 | 2–8 |
| | 100.00 | 100.00 |

When this paint is spray applied, a textured surface is formed. The texture coarseness is controlled by the degree of atomization. Higher atomization air forms a finer texture. There is a limit to the amount of paint that can be applied while still retaining an openness for air and sound passage to the substrate. Higher application rates can be applied to materials which absorb water from the paint droplet more quickly. Rapid absorption minimizes flow and the unwanted formation of a continuous film. Paint application rates as high as 60 gm/sf in one coat can be applied to high water absorption wood or mineral fiberboard and very porous nonwoven scrim, while still retaining openness in the paint layer essential for good air and sound passage.

As the fiberboard or nonwoven scrim becomes less porous, the amount of paint has to be reduced since the water in the paint is not as readily absorbed and flooding occurs closing off the surface. Between about 30 to 50 gm/sf of paint is generally ideal for retaining sufficient openness in the surface layer while not affecting the sound absorption properties of the substrate.

The above paint formulation can be used on fiberboard substrates made of fibers selected from the group of wood, mineral, glass and mixtures thereof. The paint has utility as a layer for good air and sound passage. Porosity to air flow is a measure of a material's ability to pass sound. Porosity as measured by the Frazier Airflow Test or its equivalent is necessary for sound passage. The paint coating should have a minimum porosity of not less than 50 cfm/square foot. This will than permit a substrate with a NRC rating of 65, having the above paint coating, to still have a NRC rating of 65. Lowering the paint coating porosity to about 25 cfm/square foot would reduce the substrate NRC rating to less than 65.

To obtain structures of very high NRC (>75), one begins by using a very porous wood or mineral fiber substrate plus holes punched therein, if needed, at approximately 2000 small holes/sf. A nonwoven glass scrim of 7.5 gm/sf, 20 mils thick and having a porosity of 300 cfm/square foot is laminated to this substrate using a water based adhesive. The scrim is generally of a thickness of 10 mils or thicker. Other scrims that can be used are organic fiber, glass/organic fiber combinations and like materials. The weight of the scrims is generally 6–15 gm/square foot and a porosity of 200 cfm/square foot. The scrim used is made by Owens Corning as grade A80 PFR YK111 with glass fibers of a nominal length of 6 mm and nominal diameter of 10–11 microns. The holes are visible through the glass scrim. The high solids paint is spray applied using conventional air atomized spray guns. Up to 50 gm/sf of paint can be applied without a decrease in the NRC. The surfacing is optically opaque and acoustically transparent without visible surface perforations.

As the porosity of the paint layer or the paint/scrim combination layer decreases the ability of that layer to pass sound decreases. Each layer has utility in different situations. Less porous paint layers or paint/scrim layers can be compensated for increasing the absorption of the substrate. However, this is usually accompanied by a decrease in the strength and durability of the substrate since substrate density must be decreased to increase its absorption. The most efficient system overall is one in which the absorption loss due to the paint or paint/scrim is minimized. The paint/scrim porosity should not be lower than 50 cfm/square foot. With the above paint coat, the above scrim itself requires a porosity of higher than 200 cfm/square foot.

Figure 2:
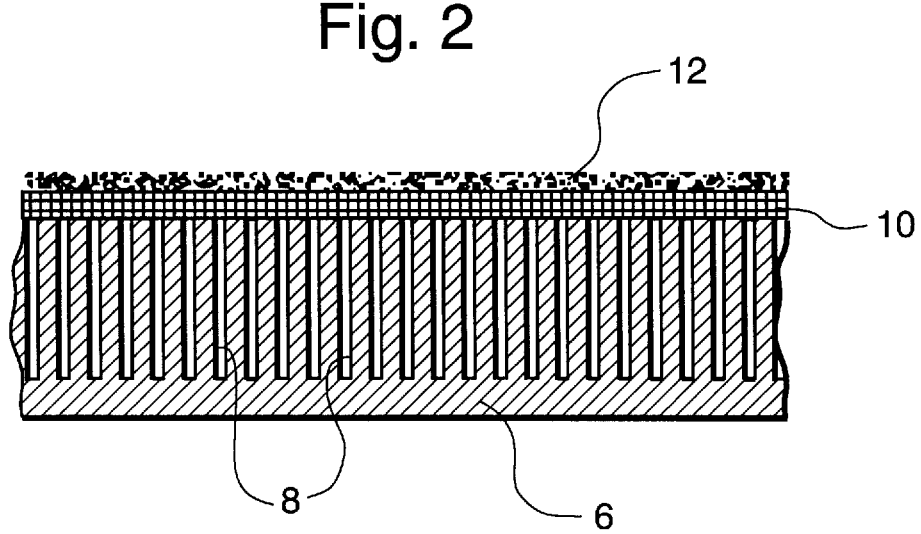
FIG. 2 is a sectional side view of a porous scrim and discontinuous paint coating on a porous perforated fiberboard.

FIG. 1 shows a porous fiberboard substrate 2 with a discontinuous paint coating 4. FIG. 2 shows a hole perforated fiberboard substrate 6 with holes 8. A porous scrim 10 is used with a discontinuous paint coating 12.

What is claimed is:

1. A coated fiberboard comprising a fiberboard substrate and a discontinuous paint coat thereon, said fiberboard having a noise reduction coefficient equal to or greater than 65, wherein the paint coat does not alter the sound absorbing characteristics of the fiberboard substrate and the paint coat is discontinuous so that the coat allows the passage of air to the substrate, the coat further being acoustically transparent to sound so that the sound goes through the coat and is absorbed in the substrate, wherein further the coat consists essentially of a latex, large size inert filler particles ranging from about 40 to 130 mesh, and very small size inert filler particles ranging from about 325 mesh and finer wherein further the coat came from an aqueous latex emulsion which is from about 70–85% solids by weight and having the large particles and small particles wherein the water and small particles have a greater affinity for the large particles than it does for the substrate so that discrete individual paint droplets were formed to make the discontinuous coat, wherein further the discontinuous coat has a porosity of not less than 50 cfm/square foot.

2. The coated fiberboard of claim 1 wherein the fiberboard substrate is made of fibers selected from the group consisting of wood, mineral, glass, and mixtures thereof.

3. The coated fiberboard of claim 1 wherein a scrim is positioned between the paint coat and the fiberboard substrate.

4. The coated fiberboard of claim 1 wherein the large and small inert filler particles are limestone, glass beads, silica, or perlite.

5. The coated fiberboard of claim 3 wherein the scrim is organic fiber or glass/organic fiber.

6. A paint coating for a sound absorbing substrate which consists essentially of: a latex emulsion, large size inert filler particles ranging from about 40–130 mesh, very small size inert filler particles ranging from about 325 mesh and finer, and water, the emulsion being from about 70–85% solids by weight and the coating having the water and small size particles which have an affinity for the large size particles so that the coating will form discrete individual paint droplets when the coating is put on the sound absorbing substrate, the coating thereby forming a discontinuous coat which will have a porosity of not less than 50 cfm/square foot and which will not alter the sound absorbing characteristics of the fiberboard substrate, wherein further sound will penetrate said coating formed and be absorbed in the substrate.

7. The coating of claim 6 wherein the large and small inert filler particles are limestone, glass beads, silica, or perlite.

* * * * *